US012389132B2

(12) United States Patent
Ren et al.

(10) Patent No.: US 12,389,132 B2
(45) Date of Patent: Aug. 12, 2025

(54) FULL GREEN INTERPOLATION IN REMOSAICING BAYER PATTERN

(71) Applicant: OmniVision Technologies, Inc., Santa Clara, CA (US)

(72) Inventors: Yiyi Ren, Cupertino, CA (US); Lei Fan, Santa Clara, CA (US); Wenshou Chen, Santa Clara, CA (US)

(73) Assignee: OmniVision Technologies, Inc., Santa Clara, CA (US)

( * ) Notice: Subject to any disclaimer, the term of this patent is extended or adjusted under 35 U.S.C. 154(b) by 335 days.

(21) Appl. No.: 18/336,099

(22) Filed: Jun. 16, 2023

(65) Prior Publication Data

US 2024/0422444 A1    Dec. 19, 2024

(51) Int. Cl.
*H04N 5/335*    (2011.01)
*H04N 23/84*    (2023.01)
*H04N 25/10*    (2023.01)

(52) U.S. Cl.
CPC ........... *H04N 23/843* (2023.01); *H04N 25/10* (2023.01)

(58) Field of Classification Search
CPC .................................................. H04N 23/843
See application file for complete search history.

(56) References Cited

U.S. PATENT DOCUMENTS

| 9,179,113 | B2 | 11/2015 | Tachi | |
|---|---|---|---|---|
| 2021/0217134 | A1* | 7/2021 | Okamura | G06T 3/4015 |
| 2021/0377497 | A1* | 12/2021 | Bernstein | H04N 25/447 |
| 2023/0196507 | A1* | 6/2023 | Hu | G06T 3/40 |
| | | | | 382/299 |

\* cited by examiner

*Primary Examiner* — Gary C Vieaux

(57) ABSTRACT

A method for full interpolating green pixels from an input image having a first minimum repeating unit comprising 4×4 pixels, where 2×2 pixels of same color are grouped together, comprises down sampling of the input image to a first down sampled image, down sampling of the input image to a second down sampled image, and interpolating green pixels resulting in an interpolated green down sampled image, where the interpolating uses jointly the first down sampled image and the second down sampled image. The interpolated green pixels in an interpolated green down sampled image are further up sampled resulting in a full interpolated green image.

19 Claims, 9 Drawing Sheets

FULL GREEN INTERPOLATION IN REMOSAICING BAYER PATTERN

FIELD OF THE INVENTION

This disclosure relates to remosaicing Bayer pattern, and particularly full green interpolation in remosaicing Bayer pattern.

BACKGROUND OF THE INVENTION

Image sensors can capture color images by combining a pixel array of photosensitive pixels with a set of color filters. Each pixel in the pixel array is coupled to a filter that removes all but a particular wavelength—that is, a particular color of light—from the light incident on the image sensor. As a result, each pixel in the pixel array captures light of a single color. The pixel is referred to a color pixel.

The color pixels are commonly arranged in a Bayer pattern. The minimum repeating unit of Bayer pattern includes 2×2 color pixels. For example, the upper-left pixel is blue, the upper-right pixel is green, the lower-left pixel is green, and the lower-right pixel is red.

Currently, an image sensor includes a large number of pixels, e.g., 200 MP (megapixel), and the size of pixel is reduced, e.g., 0.61 µm. Traditionally, each pixel is covered by a microlens to increase the light sensitivity of the pixel. While smaller size pixels can be manufactured, smaller size microlens is relatively harder to manufacture. Thus, in some embodiment, a microlens may cover 2×2 or four pixels. This may also be caused by other considerations such as for detecting phase difference of two pixels under a microlens.

In an embodiment, color pixels are arranged in a minimum repeating unit that includes 4×4 pixels. For example, in quad phase detection (QPD), an upper-left corner of the minimum repeating unit is 2×2 blue pixels under a microlens, an upper-right corner is 2×2 green pixels under a microlens, a lower-left corner is 2×2 green pixels under a microlens, and a lower-right corner is 2×2 red pixels under a microlens.

The 4×4 minimum repeating unit may be rearranged to four minimum repeating units of Bayer pattern, each minimum repeating unit including 2×2 pixels. This process is called remosaicing Bayer pattern. The remosaiced Bayer pattern may have multiple Bayer patterns. An image having Bayer patterns can be conveniently output or transmitted to other devices for further processing or displaying the image detected by the image sensor.

In the remosaicing Bayer pattern, an important step is a full green interpolation. The full green interpolation, which produces less artifact and less blurred image in the resulting remosaiced Bayer image, is demanded. A remosiced Bayer image comprises remosaiced Bayern patterns.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

Figure 1:
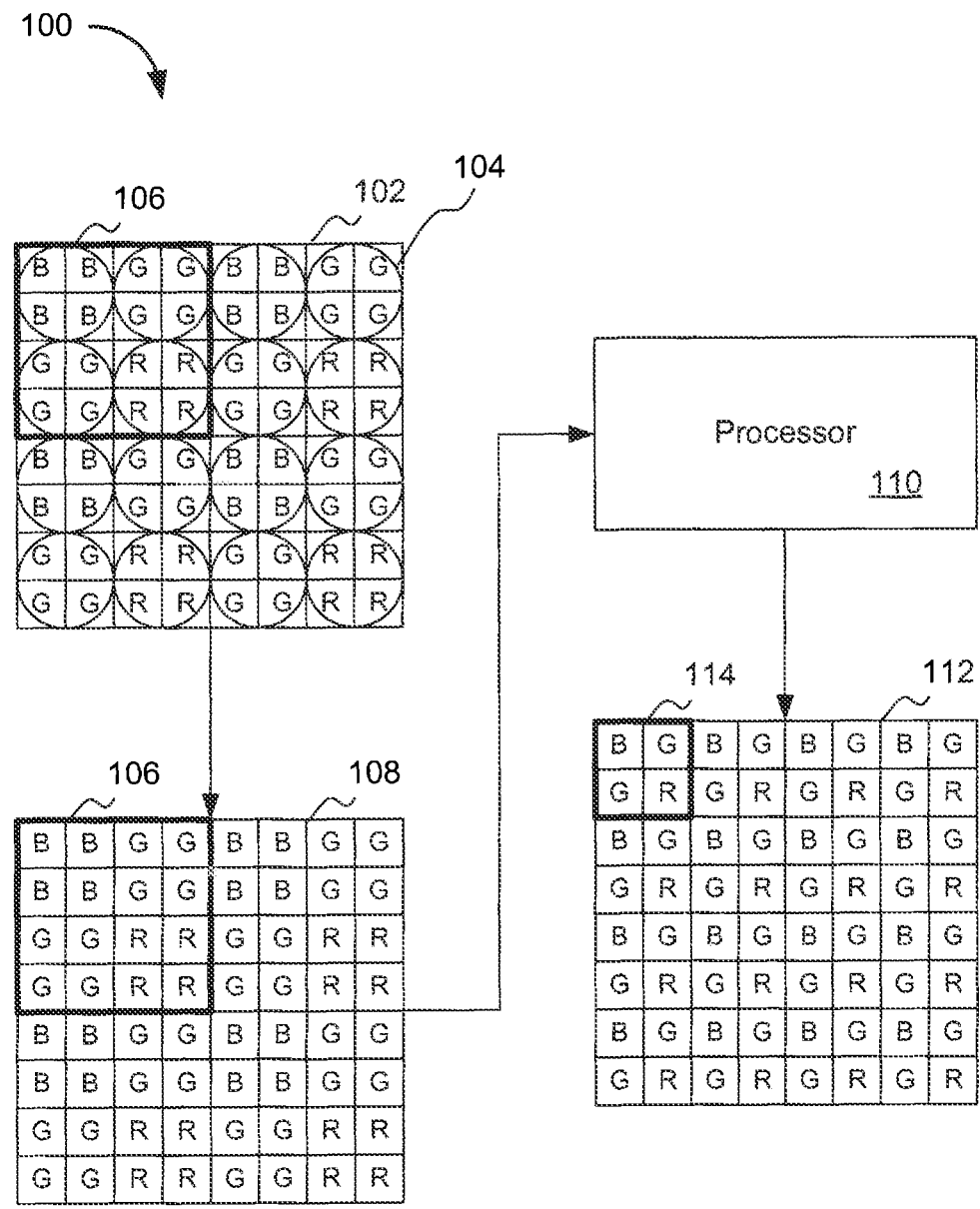
FIG. 1 shows an exemplary image sensor.

Corresponding reference characters indicate corresponding components throughout the several views of the drawings. Skilled artisans will appreciate that elements in the figures are illustrated for simplicity and clarity and have not necessarily been drawn to scale. For example, the dimensions of some of the elements in the figures may be exaggerated relative to other elements to help to improve understanding of various embodiments of the present invention.

DETAILED DESCRIPTION

In the following description, numerous specific details are set forth in order to provide a thorough understanding of the present invention. It will be apparent, however, to one having ordinary skill in the art that the specific detail need not be employed to practice the present invention. In other instances, well-known materials or methods have not been described in detail in order to avoid obscuring the present invention.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment. Furthermore, the particular features, structures or characteristics may be combined in any suitable combinations and/or sub-combinations in one or more embodiments.

FIG. 1 shows an exemplary image sensor 100 according to an embodiment of the present invention. Image sensor 100 comprises a pixel array 102. Pixel array 102 comprises a plurality of color pixels. The color pixels may be arranged in a first minimum repeating unit

C2 C2 C1 C1
C2 C2 C1 C1
C1 C1 C3 C3
C1 C1 C3 C3, where C1 is a first color, C2 is a second color, and C3 is a third color. Four neighboring pixels of a color covered by a microlens 104 form a pixel group of color. An input image 108 comprises two first color pixel groups, a second color pixel group, and a third color pixel group.

FIG. 1 shows an example where C1 is green, C2 is blue, and C3 is red. Four pixels of a color forming a super-pixel, which is the pixel group mentioned above, are covered by a microlens 104. Super-pixels, e.g., pixel groups, may be red (R), green (G), and blue (B). Super-pixels may also be sensitive to other wavelength bands including infrared (IR) and ultraviolet or may be white or panchromatic.

A G super-pixel includes four G pixels, which can be read individually. The four G pixels are covered by a first microlens. A B super-pixel includes four B pixels, which can be read individually. The four B pixels are covered by a second microlens. An R super-pixel includes four R pixels, which can be read individually. The four R pixels are covered by a third microlens. An R super-pixel, a B super-pixel, and two G super-pixel form a super-pixel Bayer pattern 106, as shown in pixel array 102.

Pixel array 102 produces an input image 108 having R, G, and B super-pixels arranged in super-pixel Bayer pattern 106. Input image 108 is an image produced by pixel array 102 of image sensor 100. Input image 108 is an input to a processor 110. Input image 108 is then processed in processor 110 to produce an image 112 comprising a plurality of individual R, G, and B pixels. The individual R, G, and B pixels form an individual pixel Bayer pattern 114. Processor 110 may be included in image sensor 100. Image 112 having Bayer pattern 114 formed by individual pixels is a standard image that may be conveniently transmitted to other devices.

Note that when the word "pixel" is mentioned, it may be a physical element of an image sensor, it may also be a value at the pixel or a position of the pixel. For example, "the interpolated green pixel comprises a linear combination" may mean "the value of the interpolated green pixel comprises a linear combination". "The interpolated G value at R pixel" may mean "the interpolated G value at the position of R pixel". Varying usages are used interchangeably in the disclosure including claims for the ease of description. It should be understood by its context.

A microlens covering four individually readable pixels may be used for detection of phase difference of two pixels under the microlens, which is for phase detection auto focus (PDAF) process. In an embodiment, it may be simply used to increase the sensitivity of the image sensor, e.g., by summing all four pixels to be a read-out value.

Figure 2A:
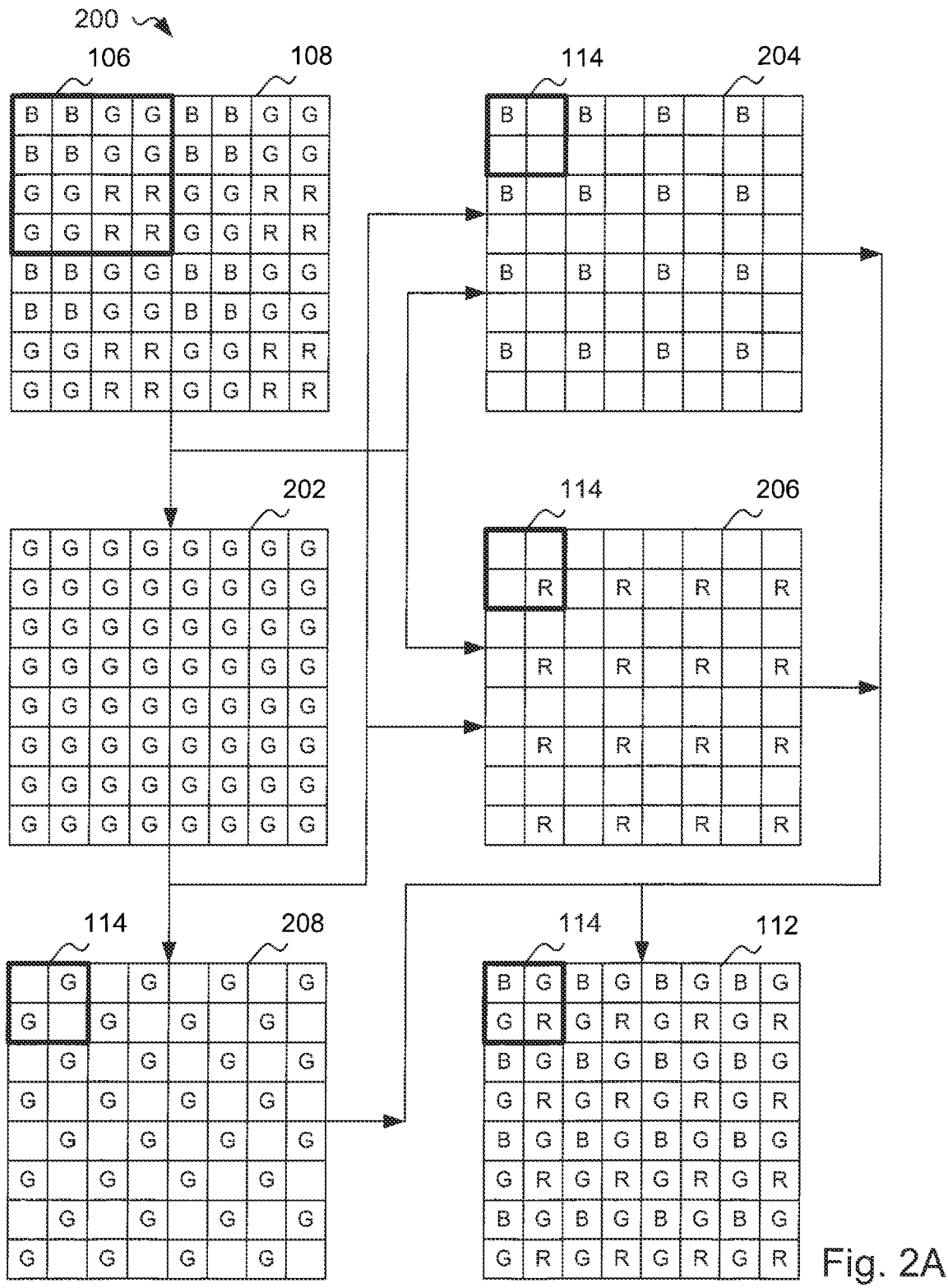
FIG. 2A shows a process to transform an image having super-pixel Bayer pattern to an image having individual pixel Bayer pattern.

FIG. 2A shows a process 200 to transform input image 108 to image 112, according to an embodiment of the present invention. Input image 108 has super-pixel Bayer pattern 106, and image 112 has individual pixel Bayer pattern 114. Process 200 is carried out by processor 110 of FIG. 1. Process 200 provides an image 202 from input image 108. For example, image 202 has interpolated G values at R pixels and B pixels, replacing respective R and B values. Image 202 is called full interpolated green image, which includes interpolated green pixels replacing R and B pixels, and original green pixels of input image 108.

In this example, image 202 includes all green pixels. In other examples, Image 202 may include all C1 pixels, and C1 may not be green. In case that C1 is not green, green pixels in the disclosure may be changed to C1 pixels. Accordingly, blue pixels in the disclosure may be changed to C2 pixels, and red pixels in the disclosure may be changed to C3 pixels.

For example, an image 204 is an interpolated blue image. Image 204 has blue values at blue pixel locations of Bayer pattern 114. Image 204 is derived from input image 108 and image 202. For example, an image 206 is an interpolated red image. Image 206 has red values at red pixel locations of Bayer pattern 114. Image 206 is derived from input image 108 and image 202. An image 208 is an interpolated green image. Image 208 has green values at green pixel locations of Bayer pattern 114. Image 208 is derived from image 202 only.

Figure 2B:
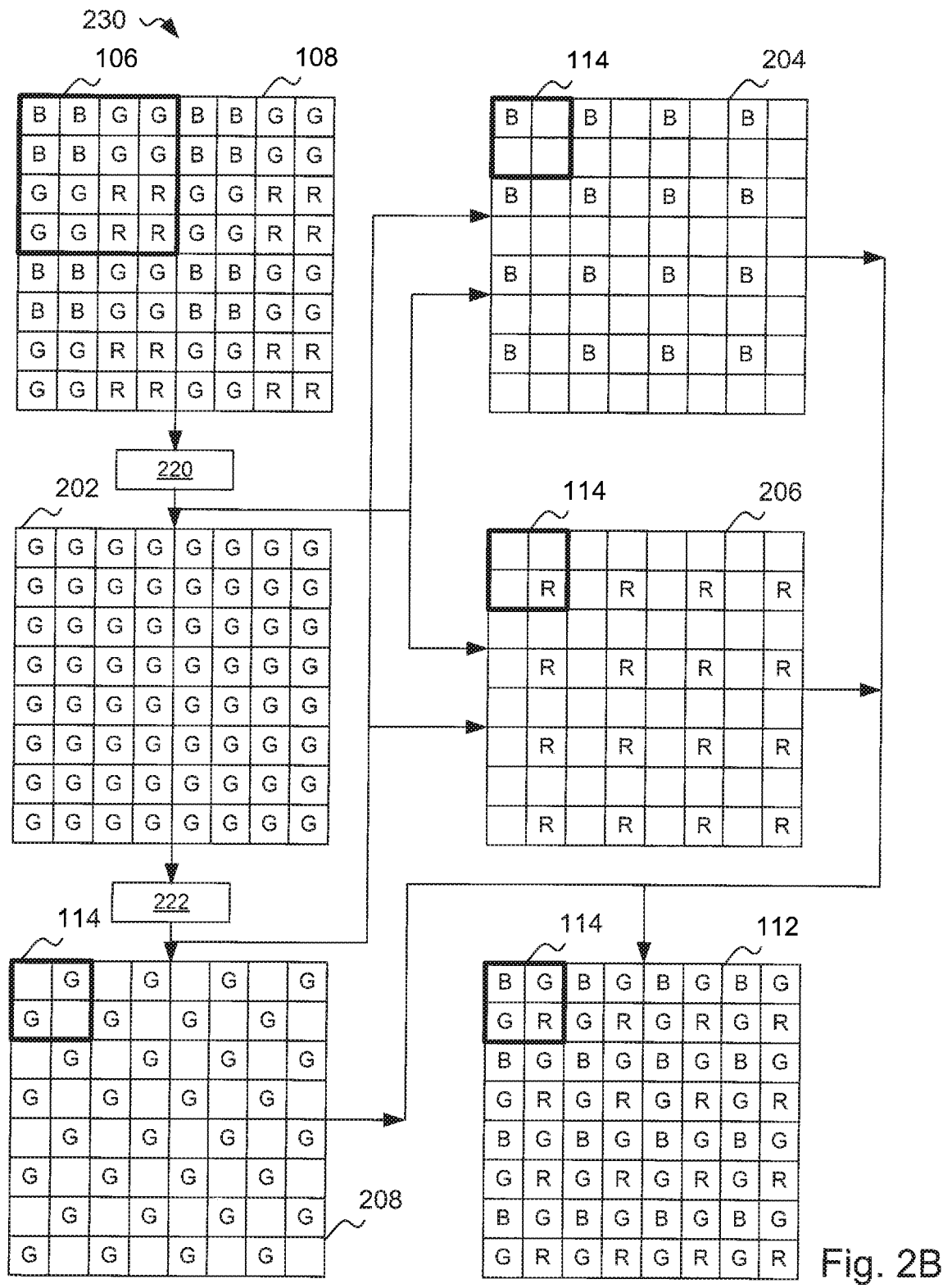
FIG. 2B is similar to FIG. 2A having optional steps.

FIG. 2B is similar to FIG. 2A, which shows a process 230 to transform input image 108 to image 112, according to an embodiment of the present invention. An optional step 220 of sensitivity correction is prior to the step providing image 202 from input image 108. An optional step 222 of green sharpening is after the step providing image 202 from input image 108. In step 220, sensitivity correction may be necessary to correct the received light intensity at a pixel under the microlens that covers four pixels. In step 222, full interpolated green image 202 may be further sharpened, for example, using high-pass filtering.

The disclosure focuses on providing full interpolated green image 202 from input image 108 produced by pixel array 102. Accordingly, the derivation of interpolated blue image 204, interpolated red image 206, interpolated green image 208, and the formation of image 112 having individual pixel Bayer pattern 114, will not be further discussed and disclosed herein.

Figure 3A:
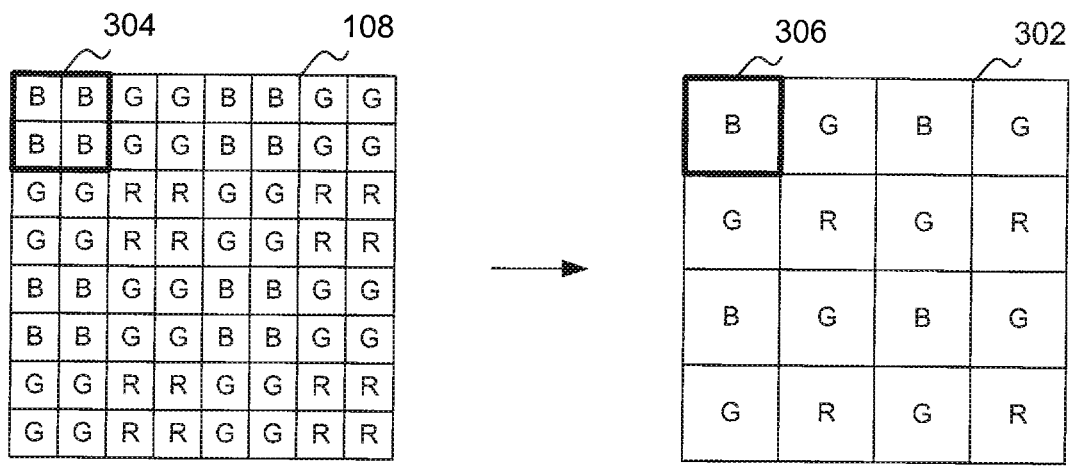
FIG. 3A shows down sampling from 2×2 pixels to one pixel.

To provide full interpolated green image 202 from input image 108 produced by pixel array 102, one starts from down sampling input image 108 to an image 302 as shown in FIG. 3A, according to an embodiment of the present invention. Image 302 is a down sampled image. Down sampling is a process to reduce the sampling data, for example, in this case, to reduce 2m×2n data to m×n data. Four pixels, i.e., 2×2, are down sampled to one pixel. Thus, the data is reduced by a factor of 4. Down sampling may be taking an average value of four values of a super-pixel, and representing the super-pixel with the averaged value. Thus, a down sampled super-pixel has only one value, and not four values. The super-pixel including 2×2 pixels become a down sampled super-pixel including only one pixel.

FIG. 3A shows down sampling from 2×2 pixels, e.g., 304, to one pixel, e.g., 306. The value of the resulting one pixel is the averaged value of the 2×2 pixel values. This type of down sampling may be known as binning. Image 302 is a down sampled image from input image 108.

Figure 3B:
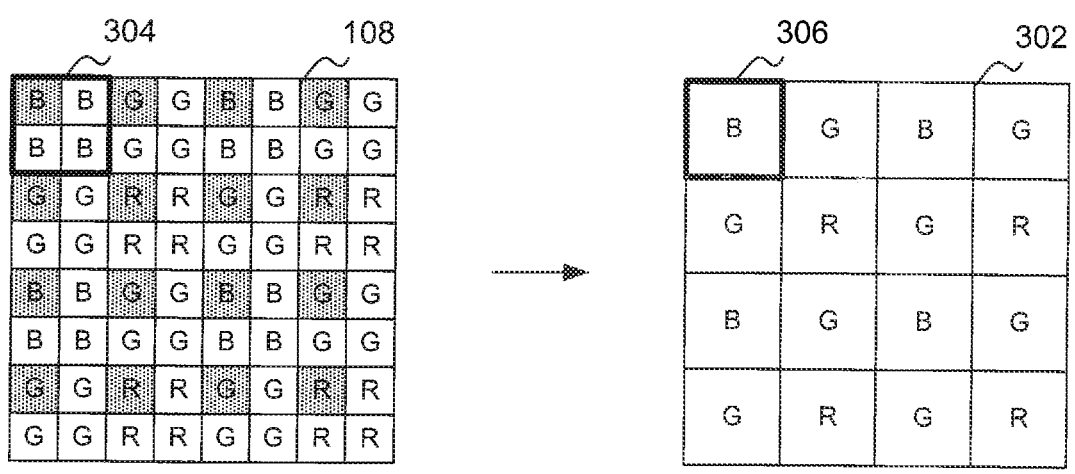
FIG. 3B shows the value of the resulting one pixel being the value of an upper-left pixel of the super-pixel including 2×2 pixels.

FIG. 3B shows that the value of the resulting one pixel, e.g., 306, may be the value of an upper-left pixel of the super-pixel including 2×2 pixels, e.g., 304, according to an embodiment of the present invention. Alternatively, an upper-right, lower-left, or lower-right pixel of the super-pixel including 2×2 pixels, e.g., 304, may be selected as well to represent the value of the resulting one pixel, e.g., 306. Image 302 is a down sampled image from input image 108.

Figure 3C:
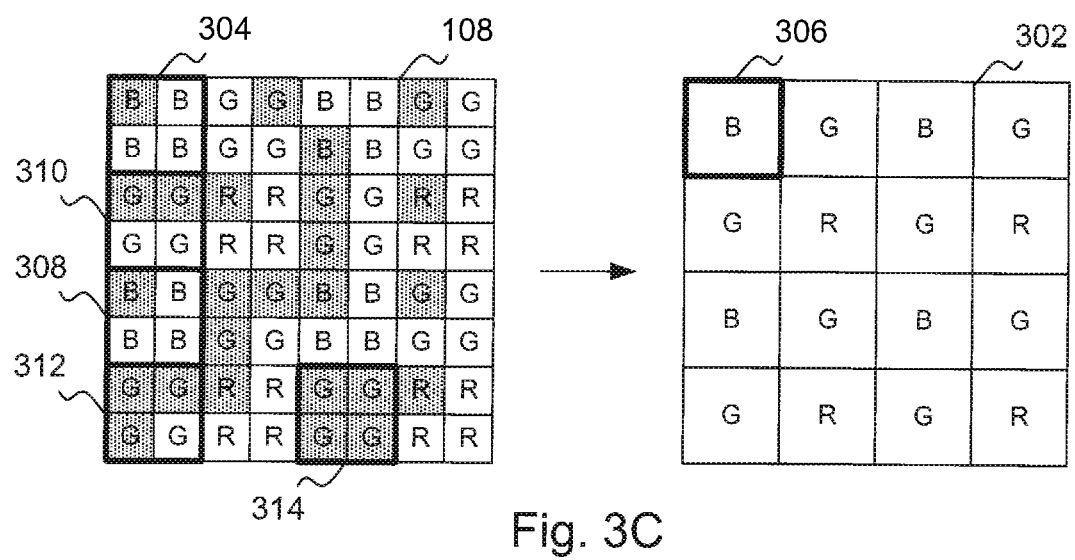
FIG. 3C shows the value of the resulting one pixel being randomly assigned.

FIG. 3C shows that the value of the resulting one pixel, e.g., 306, may be randomly assigned, according to an embodiment of the present invention. The value of the resulting one pixel may be the value of any pixel, e.g., 308, the average of any two pixels, e.g., 310, the average of any three pixels, e.g., 312, or the average of four pixels, e.g., 314, of a super-pixel, e.g., 304, including 2×2 pixels. The selection of whether one pixel, average of two pixels, average of three pixels, or average of four pixels, is random. Image 302 is a down sampled image from input image 108.

The down sampling is combining four pixels to a down sampled pixel. The combining may be taking an average of the combined pixels, taking any one pixel in a predetermined position in the combined pixels, taking an average of any two pixels in the combined pixels, or taking an average of any three pixels in the combined pixels. Two down sampled images may be different following different ways of down sampling. The color of the pixel at the same position in two down sampled images would be the same.

Figure 4A:
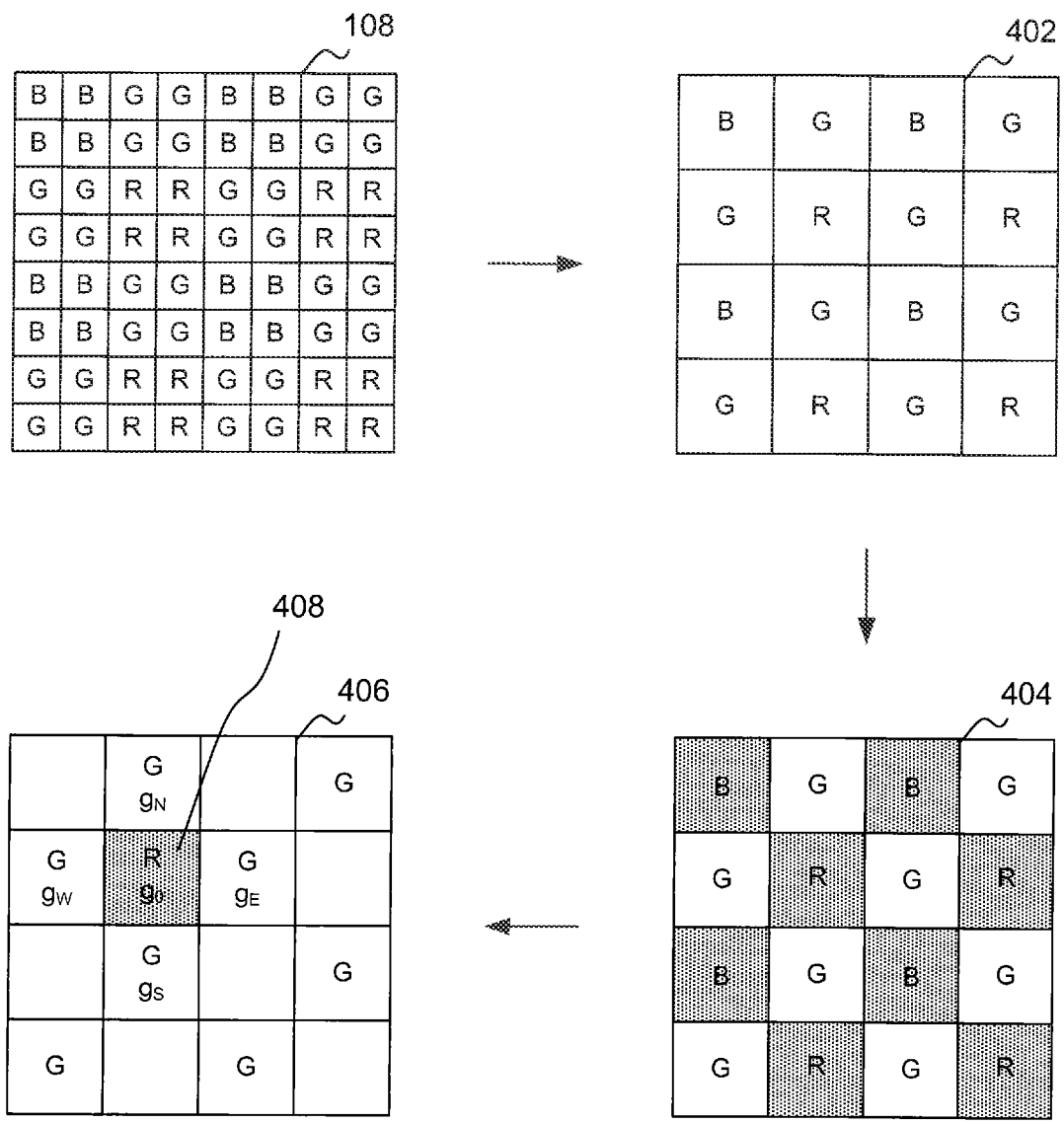
FIG. 4A shows a first down sampled image.

FIG. 4A shows a first down sampled image 402 from input image 108 following a method described in FIG. 3A, FIG. 3B, or FIG. 3C, according to an embodiment of the present invention. An image 404, which is the same as image 402, shows that B and R pixels represented by shaded pixels will be replaced with interpolated green values. For example, a green value is interpolated at a red pixel 408 of an image 406, which is the same as image 404 and image 402. In image 406, the interpolated pixel is shaded.

The interpolated green value at red pixel 408 can be expressed as follows.

$$g_0 = k_{norm} \times \left( \frac{1}{\Delta_N} g_N + \frac{1}{\Delta_E} g_E + \frac{1}{\Delta_S} g_S + \frac{1}{\Delta_W} g_W \right), \quad (1)$$

where $$k_{norm} = 1 \Big/ \left( \frac{1}{\Delta_N} + \frac{1}{\Delta_E} + \frac{1}{\Delta_S} + \frac{1}{\Delta_W} \right). \quad (2)$$

Referring to FIG. 4A, $g_N$, $g_E$, $g_S$, and $g_W$ are the green values surrounding pixel 408. In this example, pixel 408 is a red pixel. In another example, pixel 408 is a blue pixel.

Figure 4B:
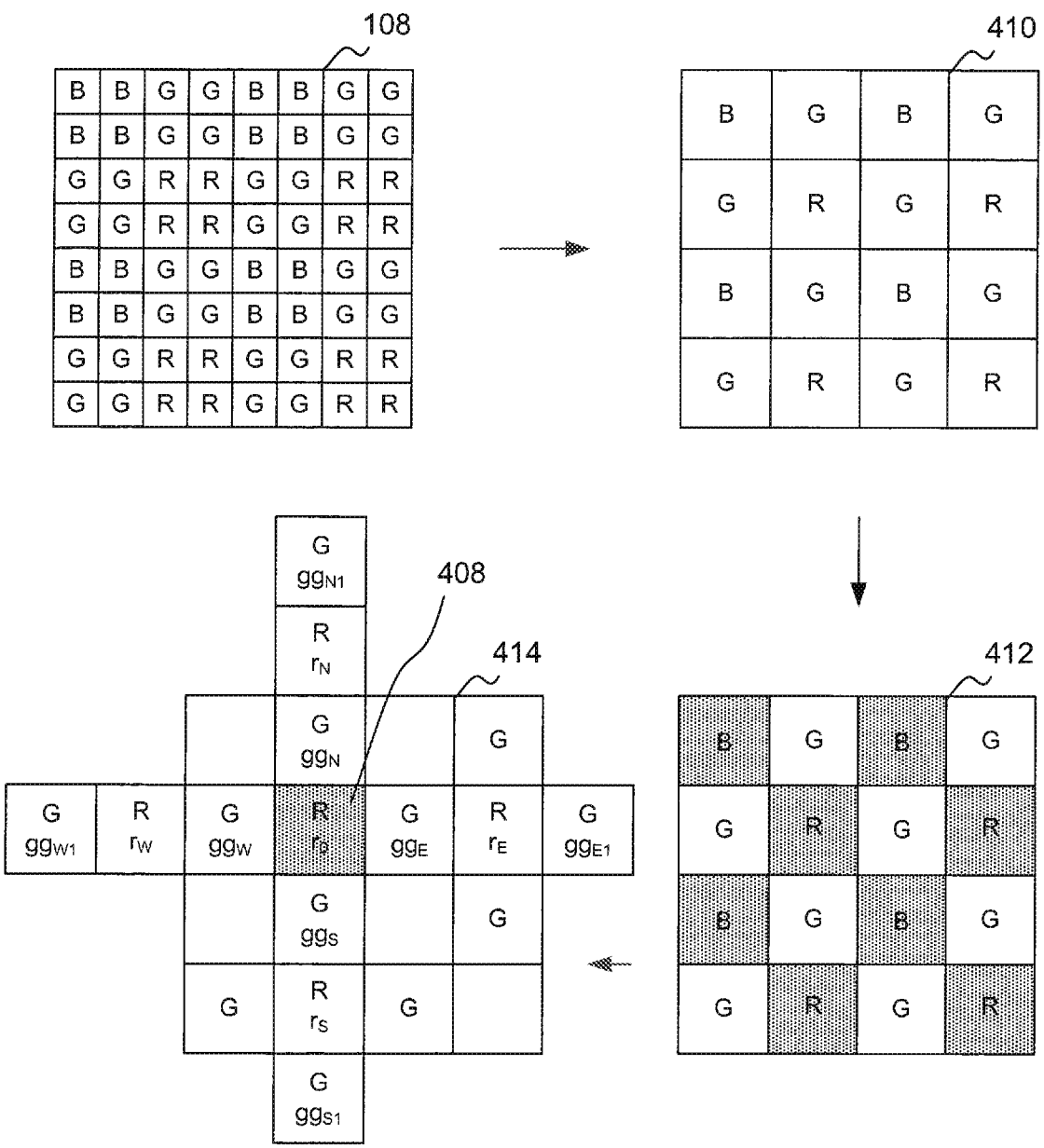
FIG. 4B shows a second down sampled image.

$\Delta N$, $\Delta E$, $\Delta S$, and $\Delta W$ will be determined as shown in FIG. 4B. FIG. 4B shows a second down sampled image 410 from input image 108 following a method described in FIG. 3A, FIG. 3B, or FIG. 3C, according to an embodiment of the present invention. Image 410 of FIG. 4B may be different from image 402 of FIG. 4A. An image 412, which is the same as image 410, shows that B and R pixels represented by shaded pixels will be replaced with interpolated green values. For example, a green value is interpolated at a red pixel 408 of an image 414, which is the same as image 412 and image 410. In image 414, the interpolated pixel 408 is shaded.

Referring to FIG. 4B, $\Delta_N$, $\Delta_E$, $\Delta_S$, and $\Delta_W$ can be expressed as follow.

$$\Delta_N = w_1 \, |gg_N - gg_S| + w_2 \, |gg_{N1} - gg_N| + w_3 \, |r_N - r_0|, \quad (3)$$

$$\Delta_E = w_4 \, |gg_E - gg_W| + w_5 \, |gg_{E1} - gg_E| + w_6 \, |r_E - r_0|, \quad (4)$$

$$\Delta_S = w_7 \, |gg_S - gg_N| + w_8 \, |gg_{S1} - gg_S| + w_9 \, |r_S - r_0|, \quad (5)$$

$$\Delta_W = w_{10} \, |gg_W - gg_E| + w_{11} \, |gg_{W1} - gg_W| + w_{12} \, |r_W - r_0|, \quad (6)$$

where $w_1$-$w_{12}$ are weight factors. In an embodiment, $w_1$-$w_{12}$ may be unity.

Referring to FIG. 4B, $gg_N$, $gg_E$, $gg_S$, $gg_W$, $gg_{N1}$, $gg_{E1}$, $gg_{S1}$, and $gg_{W1}$ are the green values surrounding pixel 408. $r_N$, $r_E$, $r_S$, and $r_W$ are the red values surrounding pixel 408, and $r_0$ is the red value at pixel 408. In this example, pixel 408 is a red pixel. In another example, pixel 408 is a blue pixel. If pixel 408 is a blue pixel, $b_N$, $b_E$, $b_S$, $b_W$, $b_0$, will replace $r_N$, $r_E$, $r_S$, $r_W$, $r_0$, respectively. $b_N$, $b_E$, $b_S$, and $b_W$ are the blue values surrounding pixel 408 (in this case, blue pixel), and $b_0$ is the blue value at pixel 408.

In particular, $gg_N$ is a green pixel next to the interpolated pixel in north direction, $gg_S$ is a green pixel next to the interpolated pixel in south direction, $r_N$ is a red pixel next to $gg_N$ in north direction, $gg_{N1}$ is a green pixel next to $r_N$ in north direction, $r_S$ is a red pixel next to $gg_S$ in south direction, $gg_{S1}$ is a green pixel next to $r_S$ in south direction, and $r_0$ is a red pixel, which is interpolated pixel 408.

Furthermore, $gg_E$ is a green pixel next to the interpolated pixel in east direction, $gg_W$ is a green pixel next to the interpolated pixel in west direction, $r_E$ is a red pixel next to $gg_E$ in east direction, $gg_{E1}$ is a green pixel next to $r_E$ in east direction. $r_W$ is a red pixel next to $gg_W$ in west direction, $gg_{W1}$ is a green pixel next to $r_W$ in west direction.

Alternatively, other formulas for $\Delta_N$, $\Delta_E$, $\Delta_S$, and $\Delta_W$ may be found and used, as far as $\Delta_N$, $\Delta_E$, $\Delta_S$, and $\Delta_W$ represent gradients in north (N), east (E), south (S), and west (W) directions, respectively, in a pixel array, e.g., pixel array 102. In this manner, since neighboring pixels are included in the interpolation of a green pixel, artifacts may be reduced by green interpolation in down sampled image, which is a Bayer image.

The interpolating comprises interpolating a green pixel at an interpolated pixel, which is a non-green pixel in the first down sampled image, the interpolated green pixel comprises a linear combination (Equation (1)) of four green pixels surrounding the non-green pixel in the first down sampled image, and the interpolating results in an interpolated green down sampled image having all green pixels. Coefficients of the linear combination are from the second down sampled image, and wherein the coefficients of the linear combination comprise $1/\Delta_N$, and $\Delta_N$ is expressed in Equation (3). The coefficients of the linear combination further comprise $1/\Delta_E$, $1/\Delta_S$, and $1/\Delta_W$.

Figure 5:
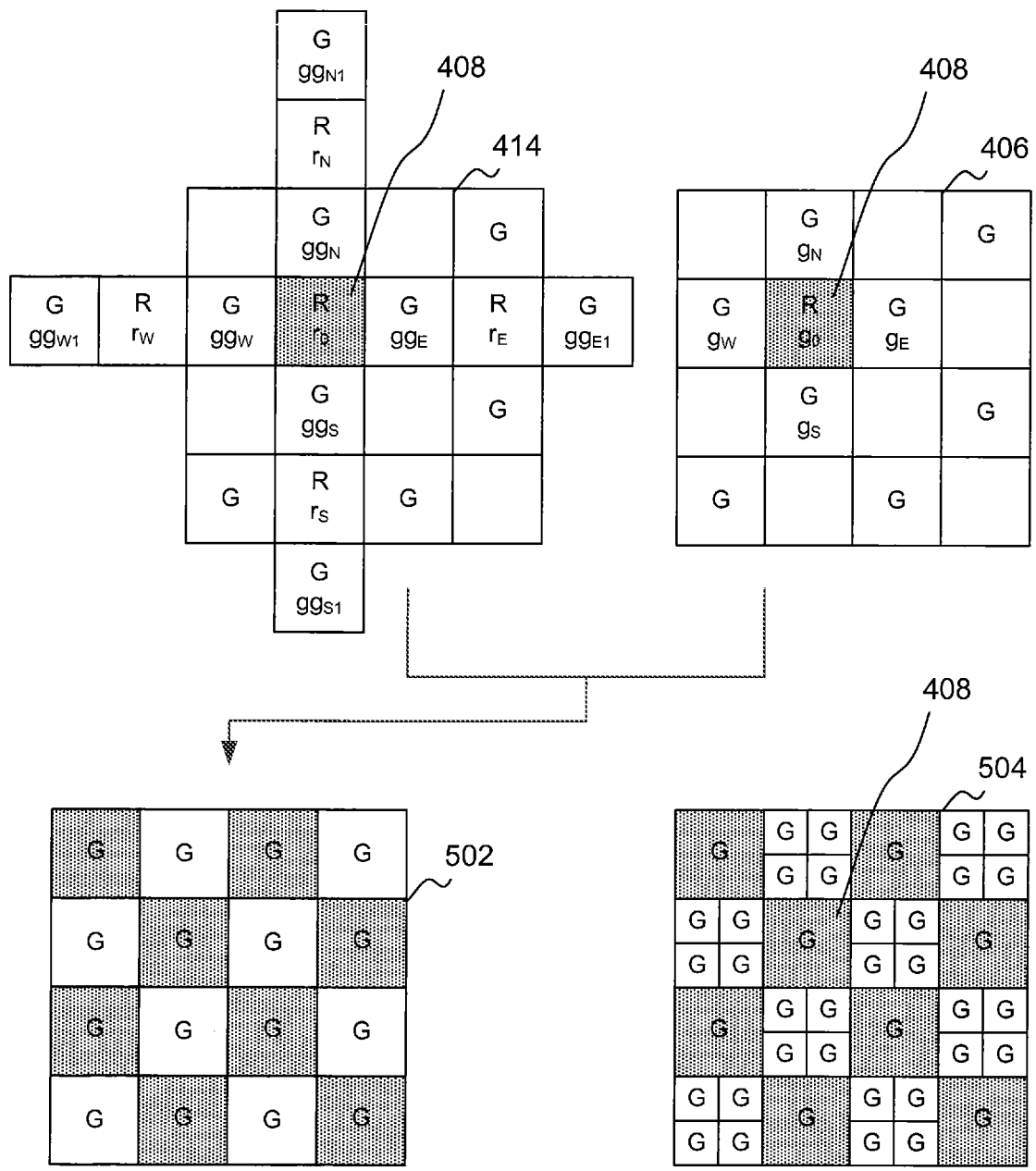
FIG. 5 shows an interpolated green down sampled image.

FIG. 5 shows an interpolated green down sampled image 502, according to an embodiment of the present invention. Interpolated green down sampled image 502 is a result of the combination of the methods described in FIGS. 4A and 4B, and Equations (1)-(6). The interpolated green values are in shaded pixels. The green values from down sampling, e.g., FIGS. 3A-3C, but not interpolated are in white (non-shaded) pixels in image 502.

An image 504 shows the green values from down sampling in white pixels may be replaced with the original green values before the down sampling, which are from input image 108. White pixels are not from interpolation. An interpolated green pixel, e.g., interpolated green pixel 408, which is a shaded pixel, in image 504, may be split or up sampled to 2×2 pixels as before the down sampling. In this manner, a full interpolated green image 202 may be obtained. The values of up sampled 2×2 pixels will be determined from the surrounding original green values before the down sampling.

Figure 6:
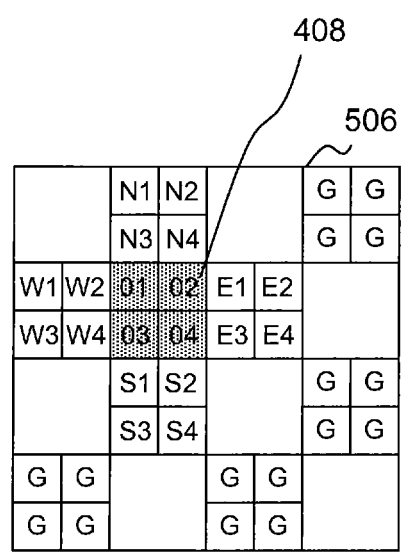
FIG. 6 shows an interpolated green pixel up sampled to 2×2 pixels.

FIG. 6 shows that interpolated green pixel 408, which is a shaded pixel, in image 506, is up sampled to 2×2 pixels, e.g., pixels 01, 02, 03, and 04, as before the down sampling. Green pixels surrounding interpolated green pixel 408 are reconstructed with their original values before the down sampling. Each green down sampled pixel has 2×2 pixels. They are: down sampled pixel north of pixel 408 having pixels N1, N2, N3, and N4; down sampled pixel south of pixel 408 having pixels S1, S2, S3, and S4; down sampled pixel east of pixel 408 having pixels E1, E2, E3, and E4; and down sampled pixel west of pixel 408 having pixels W1, W2, W3, and W4.

In an embodiment, values at pixels 01, 02, 03, and 04 are determined based on imbalance difference as follow.

$$V_{0i} = g_0 + W_N \times D_{Ni} + W_W \times D_{Wi} + W_S \times D_{Si} + W_E \times D_{Ei}, \quad (7)$$

for $$i = 1, 2, 3, 4.$$

$g_0$ is the interpolated green value at red pixel 408 expressed by Equation (1). $W_N$, $W_W$, $W_S$, and $W_E$ are as follow.

$$W_x = \frac{k_{norm}}{\Delta_x}, \quad \text{for } x = N, W, S, \text{ and } E. \quad (8)$$

$k_{norm}$ is expressed by Equation (2), and $\Delta_x$, x=N, W, S, and E, are expressed by Equations (3)-(6), respectively.

Imbalance differences ($D_{xi}$, x=N, W, S, and E, i=1, 2, 3, 4) at pixels north, west, south, and east of pixel 108 are expressed, respectively, as follow.

$$D_{Ni} = V_{Ni} - V_{N-mean}, \text{ for } i = 1, 2, 3, 4. \tag{9}$$

$V_{N-mean}$ is the mean of $V_{N1}$, $V_{N2}$, $V_{N3}$, and $V_{N4}$.

$$D_{Wi} = V_{Wi} - V_{W-mean}, \text{ for } i = 1, 2, 3, 4. \tag{10}$$

$V_{W-mean}$ is the mean of $V_{W1}$, $V_{W2}$, $V_{W3}$, and $V_{W4}$.

$$D_{Si} = V_{Si} - V_{S-mean}, \text{ for } i = 1, 2, 3, 4. \tag{11}$$

$V_{S-mean}$ is the mean of $V_{S1}$, $V_{S2}$, $V_{S3}$, and $V_{S4}$.

$$D_{Ei} = V_{Ei} - V_{E-mean}, \text{ for } i = 1, 2, 3, 4. \tag{12}$$

$V_{E-mean}$ is the mean of $V_{E1}$, $V_{E2}$, $V_{E3}$, and $V_{E4}$.

Note that $V_{xi}$ is the value at a pixel xi, x=N, W, S, and E, i=1, 2, 3, 4. In this manner, a full interpolated green image 202 is obtained by combining four pixel values found for an interpolated green pixel of down sampled interpolated green image 502 and original four pixel values of green pixels in input image 108 before down sampling. In this manner, blurred images may be corrected by full green interpolation, because the image is up sampled.

The up sampling of an interpolated green pixel in the interpolated green down sampled image comprises a linear combination of imbalance differences of four green pixels surrounding the interpolated green pixel in the interpolated green down sampled image. Coefficients of the linear combination are from the second sampled image, and wherein the coefficients of the linear combination comprise $1/\Delta_N$, and $\Delta_N$ is expressed in Equation (3). The coefficients of the linear combination further comprise $1/\Delta_E$, $1/\Delta_S$, and $1/\Delta_W$.

In an embodiment, values at pixels 01, 02, 03, and 04 are determined based on imbalance ratio as follow.

$$V_{01} = g_0(W_N \times R_{Ni} + W_W \times R_{Wi} + W_S \times R_{Si} + W_E \times R_{Ei}), \tag{13}$$

for $i = 1, 2, 3, 4.$ $g_0$ is the interpolated green value at red pixel 408 expressed by Equation (1). $W_N$, $W_W$, $W_S$, and $W_E$ are as follow.

$$W_x = \frac{k_{norm}}{\Delta_x}, \text{ for } x = N, W, S, \text{ and } E. \tag{8}$$

$k_{norm}$ is expressed by Equation (2), and $\Delta_x$, x=N, W, S, and E, are expressed by Equations (3)-(6), respectively.

Imbalance ratios ($R_{xi}$, x=N, W, S, and E, i=1, 2, 3, 4) at pixels north, west, south, and east of pixel 108 are expressed, respectively, as follow.

$$R_{Ni} = \frac{V_{Ni}}{V_{N-mean}}, \text{ for } i = 1, 2, 3, 4. \tag{14}$$

$V_{N-mean}$ is the geometric mean or the mean of $V_{N1}$, $V_{N2}$, $V_{N3}$, and $V_{N4}$.

$$R_{Wi} = \frac{V_{Wi}}{V_{W-mean}}, \text{ for } i = 1, 2, 3, 4. \tag{15}$$

$V_{W-mean}$ is the geometric mean or the mean of $V_{W1}$, $V_{W2}$, $V_{W3}$, and $V_{W4}$.

$$R_{Si} = \frac{V_{Si}}{V_{S-mean}}, \text{ for } i = 1, 2, 3, 4. \tag{16}$$

$V_{S-mean}$ is the geometric mean or the mean of $V_{S1}$, $V_{S2}$, $V_{S3}$, and $V_{S4}$.

$$R_{Ei} = \frac{V_{Ei}}{V_{E-mean}}, \text{ for } i = 1, 2, 3, 4. \tag{17}$$

$V_{E-mean}$ is the geometric mean or the mean of $V_{E1}$, $V_{E2}$, $V_{E3}$, and $V_{E4}$.

Note $V_{xi}$ is the value at a pixel xi, x=N, W, S, and E, i=1, 2, 3, 4. In this manner, a full interpolated green image 202 is obtained by combining four pixel values found for an interpolated green pixel of down sampled interpolated green image 502 and original four pixel values of green pixels in input image 108 before down sampling. In this manner, blurred images may be corrected by full green interpolation, because the image is up sampled.

The up sampling of an interpolated green pixel in the interpolated green down sampled image comprises a linear combination of imbalance ratios of four green pixels surrounding the interpolated green pixel in the interpolated green down sampled image. Coefficients of the linear combination are from the second sampled image, and wherein the coefficients of the linear combination comprise $1/\Delta_N$, and $\Delta_N$ is expressed in Equation (3). The coefficients of the linear combination further comprise $1/\Delta_E$, $1/\Delta_S$, and $1/\Delta_W$.

While the present invention has been described herein with respect to the exemplary embodiments and the best mode for practicing the invention, it will be apparent to one of ordinary skill in the art that many modifications, improvements and sub-combinations of the various embodiments, adaptations, and variations can be made to the invention without departing from the spirit and scope thereof.

The terms used in the following claims should not be construed to limit the invention to the specific embodiments disclosed in the specification and the claims. Rather, the scope is to be determined entirely by the following claims, which are to be construed in accordance with established doctrines of claim interpretation. The present specification and figures are accordingly to be regarded as illustrative rather than restrictive.

What is claimed is:

1. An image sensor comprising:
   a pixel array comprising a plurality of color pixels, wherein four pixels of a first color are covered by a first microlens, four pixels of a second color are covered by a second microlens, and four pixels of a third color are covered by a third microlens, wherein the color pixels are arranged in a first minimum repeating unit having 4×4 pixels:

C2 C2 C1 C1
C2 C2 C1 C1
C1 C1 C3 C3
C1 C1 C3 C3, wherein C1 is the first color, C2 is the second color, and C3 is the third color, four neighboring pixels of a color covered by a microlens form a color pixel group, wherein an input image comprises two first color pixel groups, a second color pixel group, and a third color pixel group; and a processor configured to interpolate the input image to result in a full interpolated first color image having all first color pixels, wherein a process to interpolate the input image comprises:

down sampling of the input image to a first down sampled image, down sampling of the input image to a second down sampled image, and interpolating a first color pixel using jointly the first down sampled image and the second down sampled image resulting in an interpolated first color down sampled image having all first color pixels.

2. The image sensor of claim 1, wherein an interpolated first color pixel in the interpolated first color down sampled image is up sampled, and the interpolated first color down sampled image having all first color pixels is up sampled to the full interpolated first color image.

3. The image sensor of claim 1, wherein the down sampling is combining four pixels to a down sampled pixel, and wherein the combining is one of taking an average of the combined pixels, taking any one pixel in a predetermined position in the combined pixels, taking an average of any two pixels in the combined pixels, and taking an average of any three pixels in the combined pixels.

4. The image sensor of claim 1, wherein the first down sampled image is different from the second down sampled image.

5. The image sensor of claim 1, wherein the first color is green, the second color is blue, and the third color is red.

6. The image sensor of claim 5, wherein the interpolating comprises interpolating a green pixel at an interpolated pixel, which is a non-green pixel in the first down sampled image, the interpolated green pixel comprises a linear combination of four green pixels surrounding the non-green pixel in the first down sampled image, and the interpolating results in an interpolated green down sampled image having all green pixels.

7. The image sensor of claim 6, wherein coefficients of the linear combination are from the second down sampled image, and wherein the coefficients of the linear combination comprise $1/\Delta_N$, and $\Delta_N = w_1|gg_N - gg_S| + w_2|gg_{N1} - gg_N| + w_3|r_N - r_0|$, wherein $gg_N$ is a green pixel next to the interpolated pixel in north direction, $gg_S$ is a green pixel next to the interpolated pixel in south direction, $r_N$ is a red pixel next to $gg_N$ in north direction, $gg_{N1}$ is a green pixel next to $r_N$ in north direction, and $r_0$ is a red pixel, which is positioned at the interpolated pixel, and wherein $w_1$, $w_2$, $w_3$, and $w_4$ are weight factors.

8. The image sensor of claim 7, wherein an interpolated green pixel in the interpolated green down sampled image is up sampled to four pixels.

9. The image sensor of claim 8, wherein the up sampling an interpolated green pixel in the interpolated green down sampled image comprises a linear combination of imbalance differences of four green pixels surrounding the interpolated green pixel in the interpolated green down sampled image.

10. The image sensor of claim 9, wherein the imbalance differences of four green pixels surrounding the interpolated green pixel in the interpolated green down sampled image comprise $D_{Ni} = V_{Ni} - V_{N-mean}$, wherein $D_{Ni}$ is an imbalanced difference of a green pixel next to the interpolated green pixel in north direction, $V_{Ni}$ is a green pixel of a green pixel group having four green pixels in the input image, and $V_{N-mean}$ is a mean of the four green pixels of the green pixel group.

11. The image sensor of claim 8, wherein coefficients of the linear combination are from the second down sampled image, and, wherein the coefficients of the linear combination comprise $1/\Delta_N$, and $\Delta_N = w_1|gg_N - gg_S| + w_2|gg_{N1} - gg_N| + w_3|r_N - r_0|$, wherein $gg_N$ is a green pixel next to the interpolated pixel in north direction, $gg_S$ is a green pixel next to the interpolated pixel in south direction, $r_N$ is a red pixel next to $gg_N$ in north direction, $gg_{N1}$ is a green pixel next to $r_N$ in north direction, and $r_0$ is a red pixel, which is positioned at the interpolated pixel, and wherein $w_1$, $w_2$, $w_3$, and $w_4$ are weight factors.

12. The image sensor of claim 8, wherein the up sampling an interpolated green pixel in the interpolated green down sampled image comprises a linear combination of imbalance ratios of four green pixels surrounding the interpolated green pixel in the interpolated green down sampled image.

13. The image sensor of claim 12, wherein the imbalance ratios of four green pixels surrounding the interpolated green pixel in the down sampled image comprise $$R_{Ni} = \frac{V_{Ni}}{V_{N-mean}},$$

wherein $R_{Ni}$ is an imbalanced ratio of a green pixel next to the interpolated pixel in north direction, $V_{Ni}$ is a green pixel of a green pixel group having four green pixels in the input image, and $V_{N-mean}$ is one of a geometric mean and a mean of the four green pixels of the green pixel group.

14. The image sensor of claim 13, wherein coefficients of the linear combination are from the second down sampled image, and wherein the coefficients of the linear combination comprises $1/\Delta_N$, and $\Delta_N = w_1|gg_N - gg_S| + w_2|gg_{N1} - gg_N| + w_3|r_N - r_0|$, wherein $gg_N$ is a green pixel next to the interpolated pixel in north direction, $gg_S$ is a green pixel next to the interpolated pixel in south direction, $r_N$ is a red pixel next to $gg_N$ in north direction, $gg_{N1}$ is a green pixel next to $r_N$ in north direction, and $r_0$ is a red pixel, which is position at the interpolated pixel, and wherein $w_1$, $w_2$, $w_3$, and $w_4$ are weight factors.

15. A method for full interpolating a first color pixels from an input image having a first minimum repeating unit

C2 C2 C1 C1
C2 C2 C1 C1
C1 C1 C3 C3
C1 C1 C3 C3, wherein C1 is the first color, C2 is the second color, and C3 is the third color; and a processor configured to interpolate the input image to result in a full interpolated first color image having all first color pixels, wherein a process to interpolate the input image comprises:

down sampling of the input image to a first down sampled image, down sampling of the input image to a second down sampled image, and interpolating a first color pixel using jointly the first down sampled image and the second down sampled image resulting in an interpolated first color down sampled image having all first color pixels.

16. The method of claim 15, wherein an interpolated first color pixel in the interpolated first color down sampled image is up sampled, and the interpolated first color down sampled image having all first color pixels is up sampled to the full interpolated first color image.

17. The method of claim 15, wherein the down sampling is combining four pixels to a down sampled pixel, and wherein the combining is one of taking an average of the combined pixels, taking any one pixel in a predetermined position in the combined pixels, taking an average of any two pixels in the combined pixels, and taking an average of any three pixels in the combined pixels.

18. The method of claim 17, wherein the first down sampled image is different from the second down sampled image.

19. The method of claim 15, wherein the first color is green, the second color is blue, and the third color is red.

* * * * *